US007673808B2

(12) United States Patent
Mace et al.

(10) Patent No.: US 7,673,808 B2
(45) Date of Patent: Mar. 9, 2010

(54) THERMOSTATIC CARTRIDGE FOR REGULATING HOT AND COLD FLUIDS TO BE MIXED, AND A MIXER TAP PROVIDED WITH SUCH A CARTRIDGE

(75) Inventors: Christian Mace, Bruyeres le Chatel (FR); Gérard Le Clanche, Draveil (FR)

(73) Assignee: Vernet S.A., Arpajon Cedex (FR)

( * ) Notice: Subject to any disclaimer, the term of this patent is extended or adjusted under 35 U.S.C. 154(b) by 579 days.

(21) Appl. No.: 11/596,388

(22) PCT Filed: May 12, 2005

(86) PCT No.: PCT/FR2005/001192

§ 371 (c)(1),
(2), (4) Date: Nov. 16, 2006

(87) PCT Pub. No.: WO2005/124495

PCT Pub. Date: Dec. 29, 2005

(65) Prior Publication Data

US 2008/0035744 A1    Feb. 14, 2008

(30) Foreign Application Priority Data

May 18, 2004    (FR)    .................................... 04 05417

(51) Int. Cl.
G05D 23/13    (2006.01)
(52) U.S. Cl. ..................... 236/12.2; 236/12.1; 236/100; 137/625.41
(58) Field of Classification Search ....... 236/12.1–12.2, 236/12.11–12.19, 12.21–12.23; 137/625.41, 137/625.4
See application file for complete search history.

(56) References Cited

U.S. PATENT DOCUMENTS 6,279,831 B1 *  8/2001  Lorch ...................... 236/12.13
6,325,295 B1 * 12/2001  Lorch ........................ 236/12.2
6,378,776 B1 *  4/2002  Chamot et al. .............. 236/100

FOREIGN PATENT DOCUMENTS

CA    2 196 228         7/2000
EP    1235129 A1 *      8/2002
FR    2 821 411         8/2002

OTHER PUBLICATIONS

EP 1 235 129 A1 English Translation.*

* cited by examiner

*Primary Examiner*—Cheryl J Tyler
*Assistant Examiner*—Paolo Gonzalez
(74) *Attorney, Agent, or Firm*—Wenderoth, Lind & Ponack, L.L.P.

(57) ABSTRACT

A thermostatic cartridge regulates hot and cold fluids to be mixed, and a mixer tap one such cartridge. The cartridge includes two disks which are used to adjust the flow of hot and cold fluids and which each include a passage for hot fluid, a passage for cold fluid, and a passage for a mixture of both. The disks are movably joined to one another. One of the disks is connected in rotation to a member for controlling the flow of the mixture, while the other is fixed. In order to do without a turbulator in the cartridge, the flow section for the mixture through the disks, which is defined by stacking passages for the mixture in the joining plane of the disks, varies according to the configuration of the control member. The majority of the thermo sensitive part of a thermostatic regulation element is positioned upstream of the disk joining plane in the direction of flow of the mixture.

13 Claims, 2 Drawing Sheets

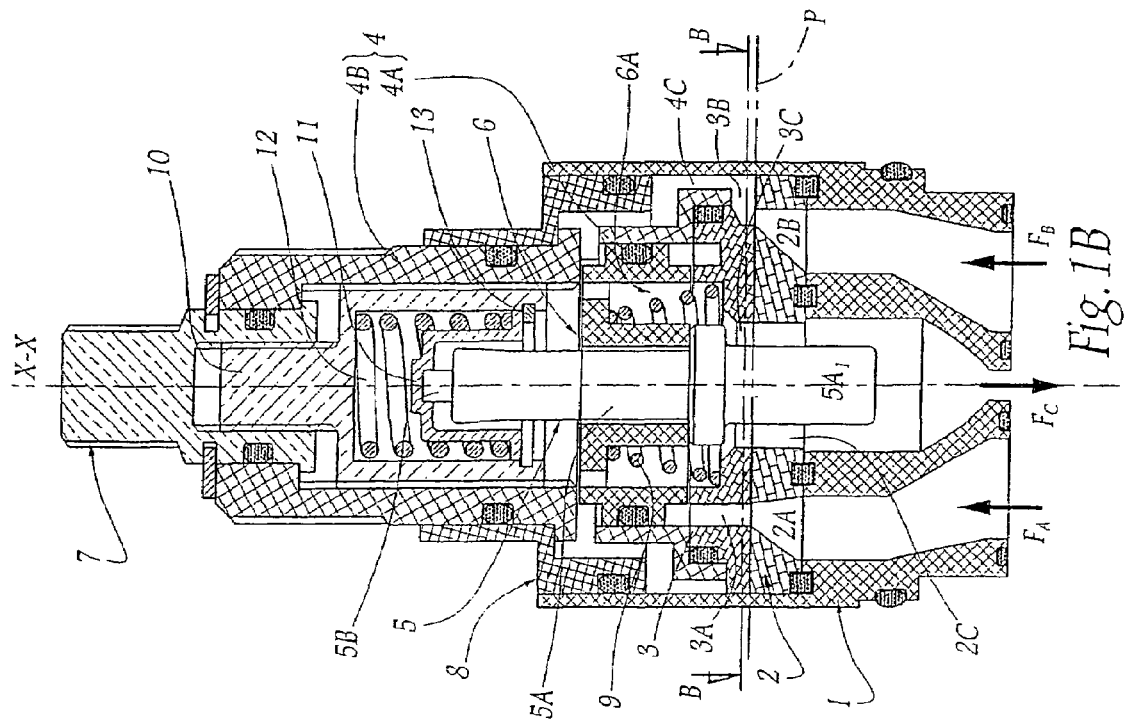
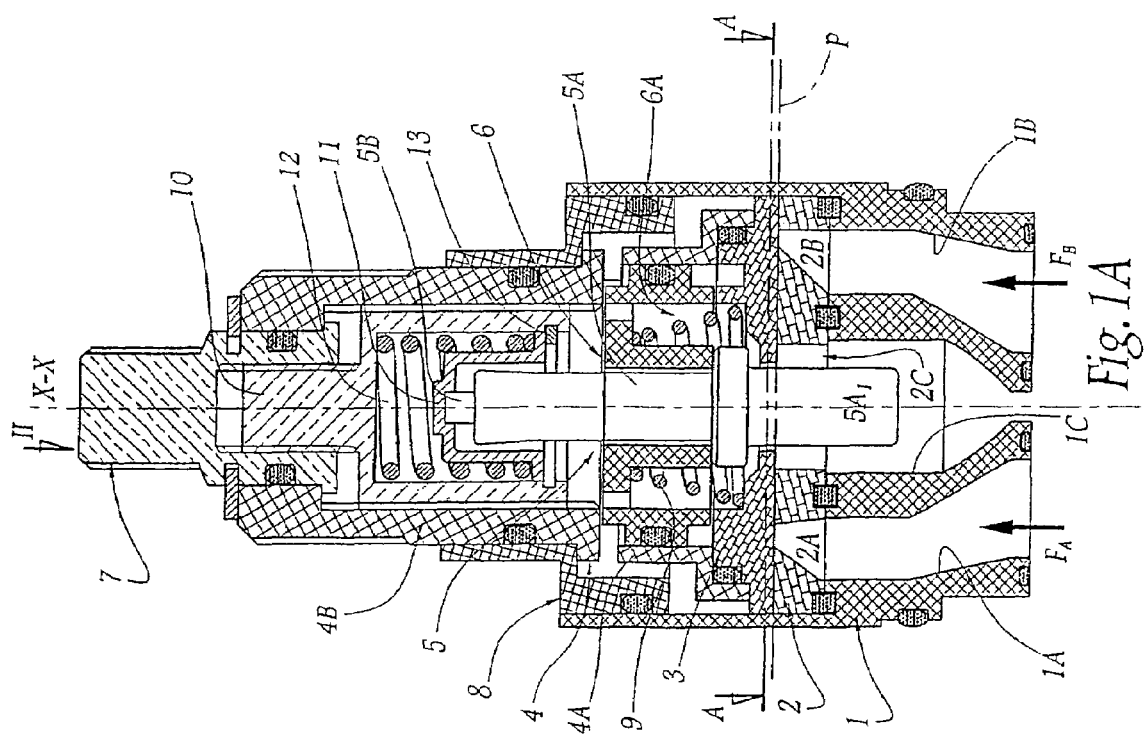

THERMOSTATIC CARTRIDGE FOR REGULATING HOT AND COLD FLUIDS TO BE MIXED, AND A MIXER TAP PROVIDED WITH SUCH A CARTRIDGE

BACKGROUND OF THE INVENTION

The present invention relates to a thermostatic cartridge for regulating hot and cold fluids to be mixed, in particular a cartridge having concentric flow rate and temperature controls, in particular of the quarter-turn type. It also relates to a mixer tap comprising such a cartridge.

Most current taps having ceramic discs do not allow the temperature of the outlet fluid, referred to as the "mixed fluid", to be stabilized effectively when the pressure and/or the temperature of at least one of the inlet fluids, referred to as the "cold fluid" and "hot fluid", vary. Therefore, there have been proposed, for those taps, cartridges provided with a thermostatic element which is intended to regulate the temperature of the mixed fluid.

FR-A-2821411 describes a thermostatic cartridge of this type, referred to as having concentric controls, that is to say, a cartridge which is intended to be fitted to a tap comprising two concentric handles for the respective controls of the flow rate and temperature of the mixed fluid. Regulation of the temperature is brought about by a sliding member which is fixedly joined to a thermostatic element while the adjustment of the flow rate is brought about by two discs of ceramic material which are movably joined to each other. One of those discs is connected in terms of rotation to a control member which is fixedly joined to the handle for controlling the flow rate, while the other disc, which is connected to the casing of the cartridge, is fixed in terms of rotation. Each disc delimits an upward passage for the hot fluid, an upward passage for the cold fluid and a downward passage for the mixture of the hot and cold fluids. The heat-sensitive portion of the thermostatic regulation element is arranged in the flow path of the mixture of the hot and cold fluids. In order to improve the quality and/or speed of the thermostatic regulation, that cartridge is provided with a fixed member for generating turbulence, commonly referred to as a "turbulator", which disrupts the flow of the mixture around the heat-sensitive portion so as to increase the turbulence thereof in order to homogenize the mixture, and to homogenize the local rate of flow at the surface of that heat-sensitive portion.

However, the presence of the turbulator inhibits the capacity for discharging the mixture at the outlet of the cartridge and therefore involves a limit of the flow rate when the tap is fully open. Conversely, for low flow rates, the turbulator does not ensure that the mixture is of a homogeneous temperature, nor that it flows along the heat-sensitive portion of the thermostatic element. In other words, the dimensions of the turbulator lead to a compromise between the desired thermostatic regulation at low flow rates and the maximum flow rate permitted by the cartridge.

SUMMARY OF THE INVENTION

The object of the invention is to provide a thermostatic cartridge of the type set out above, which allows the generation of turbulence in a generally similar manner to a fixed turbulator of the prior art, but to the same degree for low flow rates as for higher flow rates, or for a maximum flow rate greater than that permitted by a cartridge of the prior art.

To that end, the invention relates to a thermostatic cartridge for regulating hot and cold fluids to be mixed, including a casing, a member for controlling the flow rate of the mixture of the hot and cold fluids, and two elements for adjusting the flow rates of the hot and cold fluids, which each comprise a passage for the hot fluid, a passage for the cold fluid and a passage for the mixture of the hot and cold fluids, and which are movably joined to each other, one of the elements being connected in terms of rotation to the flow rate control member and the other being connected in terms of rotation to the casing. In addition, the cartridge includes a thermostatic regulation means which comprise a thermostatic element, the heat-sensitive portion of which is located in the flow path of the mixture. The cross-section of flow of the mixture of the hot and cold fluids through the adjustment elements, defined by the superimposition of the passages for the mixture in the joining zone of the adjustment elements, is variable in accordance with the configuration of the flow rate control member. In the direction of the dimension of the heat-sensitive portion which is generally parallel with the direction of flow of the mixture around that portion, at least approximately half of the heat-sensitive portion is located downstream of the joining zone of the adjustment elements.

The cartridge according to the invention is thus provided in a manner of speaking with a turbulator having variable geometry, around or upstream of the heat-sensitive portion of the thermostatic element. The overlapping of the adjustment elements which are joined to each other leads to a cross-section of flow of the mixture which varies in accordance with the configuration (orientation) of the flow rate control member, that is to say, in accordance with the outlet flow rate controlled at the cartridge. When the flow rate is low, the passages for the mixture are in fluid communication in accordance with a small proportion of one of the passages, or the two passages. Therefore, the flow of that small quantity of mixed fluid is sufficiently disrupted in order to have a generally homogeneous temperature, and is preferably conveyed along the heat-sensitive portion of the thermostatic element, which brings about good thermostatic regulation. For a greater flow rate, or a flow rate with the tap fully open, the passages for the mixture are in fluid communication to a greater extent, or totally, in order not to inhibit the flow of that great quantity of mixture. The cartridge according to the invention thus has a better compromise between the thermostatic regulation and the flow rate than the cartridges of the prior art.

According to other features of this cartridge, taken in isolation or according to any technically possible combination:
- at least three-quarters of the heat-sensitive portion are located downstream of the joining zone of the two adjustment elements;
- the heat-sensitive portion of the thermostatic element is arranged at least partially across the two passages for the mixture;
- the space between the heat-sensitive portion and the respective walls delimiting the two passages for the mixture is completely free;
- when the flow rate control member moves from a first configuration for controlling a first flow rate, optionally zero, to a second configuration for controlling a second flow rate that is higher than the first flow rate, the cross-section of flow of the mixture increases and, when the flow rate control member moves from the second configuration to the first, the cross-section decreases;
- the adjustment elements are discs which are joined to each other by means of one of their respective faces, the joining zone forming a plane which is substantially perpendicular to the direction of flow of the mixture in the passage thereof for the mixture;
- each passage for the mixture is in the form of a circle which is truncated by two chords which are substantially symmetrical relative to the center of the circle, the distance between those two chords preferably being substantially equal to the dimension of the heat-sensitive transverse portion relative to the direction of flow of the mixture around that portion;

the passages for the mixture are delimited directly by the corresponding adjustment elements; and/or the passages for the mixture are delimited by components which are fitted in a fixed manner to the corresponding adjustment elements, respectively.

The invention also relates to a mixer tap which is provided with a thermostatic cartridge as defined above.

The tap has, in comparison with taps of the prior art, better thermostatic regulation at low flow rates and admits a greater maximum flow rate with equivalent dimensions for the cartridges.

BRIEF DESCRIPTION OF THE DRAWINGS

The invention will be better understood from a reading of the following description, given purely by way of example and with reference to the drawings, in which:

FIGS. 1A and 1B are schematic longitudinal sections of a thermostatic cartridge according to the invention, taken in the same plane of section, illustrating the operation of the cartridge with zero and maximum flow rates, respectively (that is to say, illustrating the cartridge in a closed configuration and in a fully open configuration, respectively);

DETAILED DESCRIPTION OF THE INVENTION

Figure 2:
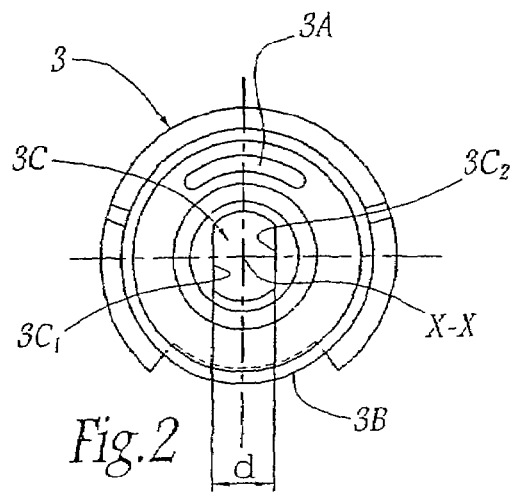
FIG. 2 is a front view, taken according to arrow II indicated in FIG. 1A, of the movable disc of the cartridge, considered in isolation.

FIGS. 1A and 1B illustrate a thermostatic cartridge which is arranged about and along a center axis X-X. That cartridge is adapted to be fitted to a mixer tap for hot water and cold water.

The cartridge comprises an outer casing 1 which delimits, at the base thereof, an eccentric inlet pipe 1A for hot water, an eccentric inlet pipe 1B for cold water and a central outlet pipe 1C for the mixture of hot and cold water, those pipes generally extending parallel with the axis X-X. The upper portion of the casing 1 receives at the same time:

a lower disc 2 of ceramic material which is centered on the axis X-X and which is connected in terms of rotation to the casing 1 in a tight manner, an upper disc 3 of ceramic material which is centred on the axis X-X and the lower face of which is joined to the upper face of the disc 2 in a joining plane P, a lower portion 4A of a flow rate control member 4 for controlling the flow rate of mixed water, that portion 4A being connected in terms of rotation to the disc 3, a thermostatic element 5 having dilatable wax, of generally cylindrical form having a circular base centered on the axis X-X, and a thermostatic regulation sliding member 6 which is mounted in a sliding and tight manner inside the portion 4A of the member 4 and which is fixedly joined, for example, by means of screwing, to the body 5A of the thermostatic element 5.

The flow rate control member 4 has an upper portion 4B, inside of which there are received a temperature control member 7 for controlling the temperature of mixed water and a screw 10 for adjusting that temperature. Both member 7 and screw 10 are connected in terms of rotation to the member 4 and connected in the manner of a screw/nut system to the member 7.

The flow rate control member 4 and the temperature control member 7 are suitable for being fixedly joined to a flow rate control handle and a temperature control handle, respectively. Those handles, which are not illustrated, belong to the mixer tap.

The casing 1 is, at the upper end thereof, hermetically closed by a stopper 8 which tightly retains the upper portion 4B of the member 4. Thus, the flow rate control member 4 is locked in terms of translation relative to the casing, but is free to rotate about the axis X-X, preferably over approximately one quarter of a circle, between a closure position, illustrated in FIG. 1A, in which the flow rate of mixed water is zero, and a fully open position, illustrated in FIG. 1B, in which the flow rate of mixed water corresponds to the maximum flow rate permitted by the cartridge.

The thermostatic element 5 comprises a piston 5B, the free end of which is in permanent contact with an over-travel abutment 11 in the form of a bell-like member. In the absence of over-travel of the piston 5B, a compression spring 12 which is interposed axially between the screw 10 and an abutment 11, maintains that abutment against a stop washer 13 so that the position of the piston along the axis X-X is fixed. In that manner, when the thermostatic element 5 extends and the height of the piston 5B is maintained in a fixed manner by the spring 12, the body 5A of the element moves in translation along the axis X-X and correspondingly displaces the sliding member 6 between the upper face of the upper disc 3 and the lower face of the upper portion 4B of the member 4. A return spring 9 of the sliding member is interposed between the upper face of the disc 3 and the sliding member.

Figure 3:
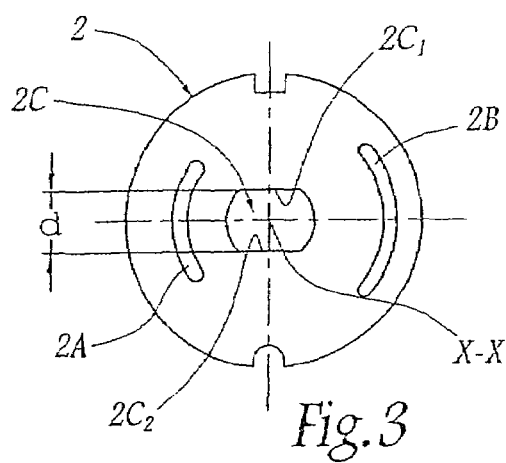
FIG. 3 is a view similar to FIG. 2, illustrating the fixed disc of the cartridge.

As illustrated in FIGS. 1A, 1B and 3, the lower disc 2 delimits, facing the hot water inlet pipe 1A, cold water inlet pipe 1B and mixed water outlet pipe 1C, a respective hot water inlet passage 2A, cold water inlet passage 2B and mixed water outlet passage 2C. The inlet passages 2A and 2B extend in the manner of circular arcs which are centered on the axis X-X, at one side and the other of the axis X-X, respectively, while the outlet passage 2C is generally centered on the axis X-X.

The upper disc 3 also comprises a hot water inlet passage 3A, a cold water inlet passage 3B and a mixed water outlet passage 3C, as illustrated in FIGS. 1A, 1B and 2. The hot water passage 3A and cold water passage 3B extend in the manner of circular arcs which are centered on the axis X-X, at one side and the other of the axis X-X, respectively, with respective radii which are substantially equal to those of the inlet passages 2A and 2B. Unlike the inlet passages 2A, 2B and 3A, the passage 3B opens over the entire length of its arc, at the periphery of the disc 3 in order to constitute a lateral passage for cold water, allowing the cold water to flow radially outwards from the disc.

The cartridge illustrated thus has an assembly structure which is similar to that of the cartridge described in FR-2821411. Therefore, it will not be described in greater detail here with regard to its common provisions relative to the cartridge of the above-mentioned document, to which the reader may refer.

Figure 4A:
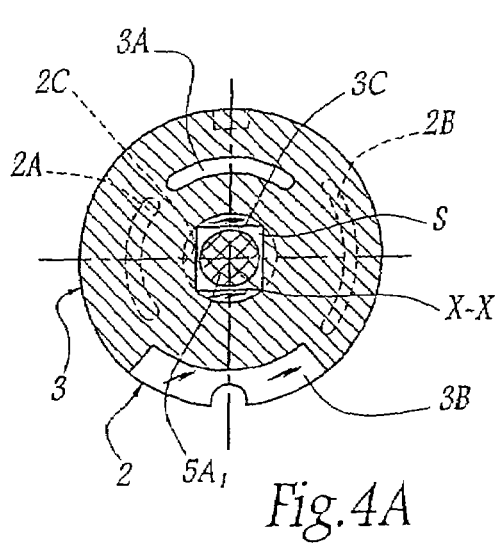
FIGS. 4A and 4B are sections in the planes A-A and B-B in FIGS. 1A and 1B, respectively, only the discs of the FIGS. 2 and 3 and the thermostatic element of the cartridge being illustrated.
Figure 4B:
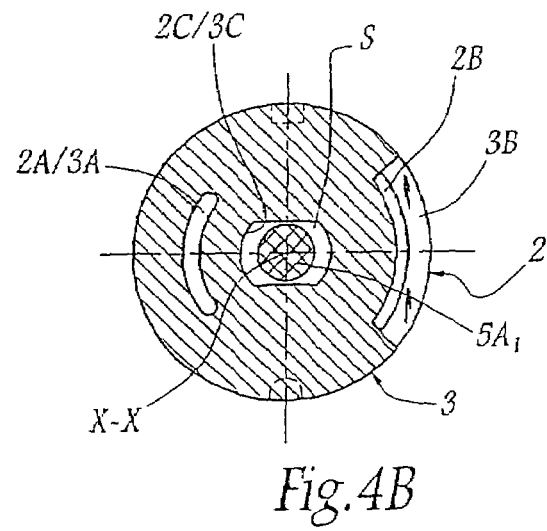

According to the invention, the outlet passages 2C and 3C do not have, in cross-section, a strictly circular shape centered on the axis X-X, but instead each has a shaped defined by a circle which is truncated by a pair of chords $2C_1$, $2C_2$ and $3C_1$, $3C_2$ which are substantially symmetrical relative to the center of the circle. In the example illustrated, the respective geometries of the passages 2C and 3C are substantially identical. For each disc 2 and 3, the radial distance d separating the rectilinear walls $2C_1$ and $2C_2$ and $3C_1$ and $3C_2$, respectively, is substantially equal, to within operational tolerances, to the diameter of the heat-sensitive portion $5A_1$ of the body 5A of the thermostatic element 5. That heat-sensitive portion $5A_1$ is, when the cartridge is in the assembled state, arranged across the openings 2C and 3C, independently of the position of the discs 2 and 3. As illustrated in FIGS. 4A and 4B set out below, the more or less extensive superimposition of the passages 2C and 3C thereby defines the cross-section S of flow of mixed water through the discs 2 and 3 which, from a geometrical point of view, corresponds to the intersection of the cross-sections of those passages 2C and 3C in the plane P, subtracted from the cross-section of the heat-sensitive portion $5A_1$ of the thermostatic element 5. Furthermore, as also illustrated in FIGS. 4A and 4B, the cylindrical body (heat sensitive portion) 5A extends through the mixed fluid passages 2c, 3c and has a circular cross-section.

When the cartridge is in its closed configuration of FIGS. 1A and 4A, the discs 2 and 3 are positioned relative to each other so that no fluid communication is brought about between the passages for hot water 2A and 3A and between the passages for cold water 2B and 3B. Therefore, the outlet flow rate of the cartridge is zero. In this configuration, the outlet passages 2C and 3C are partially in fluid communication, as illustrated in FIG. 4A, although no fluid flows through them in practice because the hot water and cold water inlets are closed. It is understood here that a zone of the passage 2C and a zone of the passage 3C are in fluid communication when those two zones overlap each other in a direction parallel with the axis X-X, which means that those two zones are a continuation of each other in that direction without any material being interposed. The rectilinear walls $2C_1$ and $2C_2$ extend in respective planes which are perpendicular to the planes containing the rectilinear walls $3C_1$ and $3C_2$, respectively. In other words, the cross-section S of flow of mixed water through the discs 2 and 3 corresponds, in the plane P, to a square which has a side measurement d and which is centered on the axis X-X, subtracted from the cross-section of the portion $5A_1$ of the thermostatic element 5.

When the cartridge is in its fully open configuration of FIGS. 1B and 4B, hot water enters the cartridge via the pipe 1A of the casing 1, as indicated by the arrow $F_A$, travels along the passages 2A and 3A of the discs 2 and 3, flows into an annular channel defined between the disc 3, the member 4 and the sliding member 6, passes through the space between the disc 3 and the sliding member and reaches the interior of the sliding member 6, in the region of the base of an internal chamber 6A of that sliding member. At the same time, cold water enters the cartridge via the pipe 1B, as indicated by the arrow $F_B$, passes along the passages 2B and 3B of the discs 2 and 3 and, after being discharged radially from the lateral passage 3B of the disc 3, flows into an annular channel 4C which is defined between, at one side, the lower portion 4A of the member 4 and, at the other side, the casing 1 then the stopper 8 in order to reach the upper portion of the sliding member 6 and pass via the space between the sliding member and the upper portion 4B of the member 4 before being introduced into the upper portion of the chamber 6A. The mixing of the hot water and cold water begins inside the chamber 6A and continues inside the passages 2C and 3C which extend in a symmetrical manner relative to the joining plane P and which are therefore completely in fluid communication. In other words, the entirety of the passage 3C is in fluid communication with the entirety of the passage 2C and the cross-section S of flow of mixed water is therefore equal to the whole of the cross-section of the passage 3C, which is itself equal to that of the passage 2C, subtracted from the cross-section of the portion $5A_1$ of the thermostatic element 5. Downstream of the plane P, the mixed water flows around the heat-sensitive portion $5A_1$ of the thermostatic element 5 and is then discharged via the pipe 1C, as indicated by the arrow $F_C$.

Between the configurations involving total closure and total opening of the cartridge, the adjustment of the flow rate is obtained by rotating the flow rate control member 4 by means of the corresponding handle of the tap, which brings about rotation of the disc 3 defining the angular position of that disc relative to the disc 2. Thereby, the cross-section of flow for the hot water results from the greater or lesser superimposition of the passages 2A and 3A, and the cross-section of flow for the cold water results from the greater or lesser superimposition of the passages 2B and 3B. The shapes of those passages 2A, 3A, 2B and 3B are adapted so that the cross-sections of flow of hot water and cold water are equal, whatever the relative angular position between the two discs, those cross-sections of flow varying from complete closure to maximum opening.

In the same manner, the angular position of the disc 3 relative to the disc 2 also defines the cross-section S of flow of mixed water which varies between its value in FIG. 4A and its value in FIG. 4B, thereby changing continuously from a minimum to a maximum. It will be clearly appreciated by comparing FIGS. 4A and 4B because, in order to move from one of those Figures to the other, the disc 3 has to be moved in rotation about the axis X-X by a quarter of a turn relative to the fixed disc 2.

The shapes of the passages 2C and 3C are advantageously adapted so that the cross-section S of flow of mixed water resulting from the greater or lesser superimposition of the passages 2C and 3C is substantially equal to the sum of the cross-sections of flow of hot water and cold water being admitted, whatever the relative angular position between the two discs. In the same manner, the superimposition of the passages 2C and 3C does not significantly slow down the flow of the mixture being discharged from the cartridge.

Since only a portion of the passage 3C is in fluid communication with the passage 2C when the cartridge is not in a fully open configuration, occurrences of turbulence are brought about within the mixed water when it passes through the joining plane P of the discs 2 and 3. In the region of this plane P, the turbulence generated homogenizes the temperature of the mixed water while, downstream of the plane P, the non-circular shape of the passages 2C and 3C conveys the mixed water in such a manner that it flows along the heat-sensitive portion $5A_1$. In order for the thermal load of the thermostatic element 5 to be effective, it is important that, as illustrated, the majority of the heat-sensitive portion $5A_1$ is arranged in accordance with the flow $F_C$ (that is to say, along axis X-X) downstream of the zone in which turbulence is generated (in other words, downstream of the joining plane P).

The position of the joining plane P along the heat-sensitive portion $5A_1$, in the direction of flow $F_C$, is not, however, limited to that illustrated in FIGS. 1A and 1B. The joining zone can be located further downstream but, in order to ensure a sufficiently turbulent effect, at least approximately half of that heat-sensitive portion must be located downstream of the joining plane P, and preferably at least three-quarters.

Furthermore, since the distance d is substantially equal to the diameter of the heat-sensitive portion $5A_1$, it is not possible for a member to be arranged around the heat-sensitive portion in the region of the joining plane P, such a member tending to generate a hindrance to the flow of mixed water downstream and being at risk of cancelling out the turbulent effect sought.

As set out in the document FR-2 821 411, when the temperature of the mixed water increases around the heat-sensitive portion $5A_1$, the thermostatic element 5 extends and the sliding member 6 regulates the temperature of the mixed water by reducing the quantity of hot water admitted into the chamber 6A and increasing the quantity of cold water. Adjusting the temperature at which the regulation is controlled is brought about by rotating the temperature control member 7, which carries the screw 10 and therefore moves the height of the piston 5B in translation along the axis X-X. Furthermore, if the cold water is interrupted, any risk of being scalded is prevented by the hot water automatically being shut off, the over-travel (compression) spring 12 then being compressed by the extensive displacement of the piston 5B.

Various arrangements and variants (individually or in combination) relating to the cartridge described above can further be envisaged as noted below.

Rather than the passages 2C and 3C being directly delimited by the discs 2 and 3, those passages can be delimited by components which are carried in a fixed manner on those discs, respectively. It may be provided, for example, that each disc delimits a central opening which is substantially circular, and that components carrying the rectilinear walls $2C_1$, $2C_2$ and $3C_1$, $3C_2$ are fitted in a fixed manner at two diametrically opposed locations of each of those openings.

A portion of the space between the heat-sensitive portion $5A_1$ and the walls which delimit the passages 2C and 3C, respectively, may serve as a housing for a component, in particular a portion of the return spring 9, provided that that component does not constitute a significant hindrance to the flow of the mixed water in the region of the passages 2C and 3C.

The heat-sensitive portion $5A_1$ is not necessarily arranged across the passages 2C and 3C but instead can, in particular for a larger cartridge, be completely arranged outside those passages.

Other elements, which are joined to each other, for adjusting the flow rate may be used in place of the discs 2 and 3 of ceramic material, for example, ball type systems or plates with sealed joints.

The invention claimed is:

1. A thermostatic cartridge for regulating mixing of hot fluid and cold fluid, said thermostatic cartridge comprising: a casing; a flow rate control member for controlling a flow rate of a mixture of the hot fluid and the cold fluid; a plurality of adjustment elements for adjusting the flow rate of the hot fluid and the cold fluid, each of said adjustment elements having a hot fluid passage, a cold fluid passage, and a mixed fluid passage for allowing passage of the mixture of the hot fluid and the cold fluid, said hot fluid passage, said cold fluid passage, and said mixed fluid passage being movably joined to each other, a first one of said adjustment elements being connected with respect to rotation to said flow rate control member, and a second one of said adjustment elements being connected with respect to rotation to said casing; and a thermostatic regulation device including a thermostatic element having a heat-sensitive portion located in a flow path of the mixture of the hot fluid and the cold fluid; wherein said hot fluid passage, said cold fluid passage, and said mixed fluid passage of each of said first one of said adjustment elements and said second one of said adjustment elements are arranged to be superimposed at a joining zone between said first one of said adjustment elements and said second one of said adjustment elements, and a flow of the mixture of the hot fluid and the cold fluid passing through said mixed fluid passage of each of said first one of said adjustment elements and said second one of said adjustment elements having a cross-section that is variable according to an orientation of said flow rate control member; and wherein said thermostatic element is configured and arranged such that said heat-sensitive portion extends in a direction generally parallel with a direction of flow of the mixture of the hot fluid and the cold fluid around said heat-sensitive portion, and such that at least half of said heat-sensitive portion is located downstream of said joining zone of said adjustment elements.

2. The cartridge according to claim 1, wherein said thermostatic element is configured and arranged such that at least three-quarters of said heat-sensitive portion is located downstream of said joining zone of said adjustment elements.

3. The cartridge according to claim 1, wherein said heat-sensitive portion of said thermostatic element is arranged at least partially across said mixed fluid passage of said first one of said adjustment elements and at least partially across said mixed fluid passage of said second one of said adjustment elements.

4. The cartridge according to claim 3, wherein a space between said heat-sensitive portion and respective walls delimiting said mixed fluid passage of said first one of said adjustment elements and said mixed fluid passage of said second one of said adjustment elements is completely free.

5. The cartridge according to claim 1, wherein, when said flow rate control member moves from a first orientation for allowing a first flow rate to a second orientation for allowing a second flow rate higher than the first flow rate, the cross-section of the flow of the mixture of the hot fluid and the cold fluid increases and, when said flow rate control member moves from the second orientation to the first orientation, the cross-section of the flow of the mixture of the hot fluid and the cold fluid decreases.

6. The cartridge according to claim 1, wherein said adjustment elements are discs joined to each other by respective faces of said discs, said joining zone forming a plane substantially perpendicular to the direction of flow of the mixture of the hot fluid and the cold fluid through the mixed fluid passage.

7. The cartridge according to claim 1, wherein said mixed fluid passage of each of said first one of said adjustment elements and said second one of said adjustment elements is shaped as a circle truncated by two chords substantially symmetrical relative to a center of said circle.

8. The cartridge according to claim 7, wherein a distance between said two chords is substantially equal to a width of said heat-sensitive portion across the direction of flow of the mixture of the hot fluid and the cold fluid around said heat-sensitive portion.

9. The cartridge according to claim 1, wherein said mixed fluid, passage of said first one of said adjustment elements and said mixed fluid passage of said second one of said adjustment elements are directly defined by said adjustment elements.

10. The cartridge according to claim 1, wherein said mixed fluid passage of said first one of said adjustment elements and said mixed fluid passage of said second one of said adjustment elements are defined by components fitted in a fixed manner to said adjustment elements, respectively.

11. The cartridge according to claim 1, wherein said plurality of adjustment elements comprises only two adjustment elements including said first one of said adjustment elements and said second one of said adjustment elements.

12. The cartridge according to claim 1, wherein each of said adjustment elements comprises a disc, said mixed fluid passage of each of said adjustment elements comprising a through-hole in said disc, said through-hole being shaped as a circle truncated by two chords substantially symmetrical relative to a center of said circle.

13. The cartridge according to claim 12, wherein said heat-sensitive portion of said thermostatic element has a cylindrical shape with a circular cross-section, and extends through said mixed fluid passage of each of said adjustment elements.

* * * * *